United States Patent

[11] 3,607,721

| [72] | Inventor | Elmer Nagy<br>Edmonton, Alberta, Canada |
|---|---|---|
| [21] | Appl. No. | 837,749 |
| [22] | Filed | June 30, 1969 |
| [45] | Patented | Sept. 21, 1971 |
| [73] | Assignees | Cities Service Athabasca, Inc.;<br>Imperial Oil Limited; Atlantic Richfield<br>Corporation; Royalite Oil Company<br>Limited, , part interest to each |

[54] PROCESS FOR TREATING A BITUMINOUS FROTH
5 Claims, 1 Drawing Fig.

| [52] | U.S. Cl. | 208/11 |
|---|---|---|
| [51] | Int. Cl. | C10g 1/04 |
| [50] | Field of Search | 208/11 |

[56] References Cited
UNITED STATES PATENTS

| 2,910,424 | 10/1959 | Tek et al. | 208/11 |
|---|---|---|---|
| 2,968,603 | 1/1961 | Coulson | 208/11 |
| 3,487,003 | 12/1969 | Baillie et al. | 208/11 |

*Primary Examiner*—Curtis R. Davis
*Attorney*—J. Richard Geaman

ABSTRACT: A method for the removal of solids and emulsified water from a bituminous froth resulting from the hot water treatment of Athabasca tar sands. The froth is diluted with a light hydrocarbon diluent such as coker naphtha and fed to a settling vessel where the solids and water droplets settle out in the form of a sludge constituting a concentrated stable emulsion containing most of the impurities. The substantially purified bituminous froth is withdrawn as overflow. The settled sludge is removed from the bottom of the vessel at rates of between 4 and 5 percent by volume of the diluted bituminous froth feed rate and centrifuged to recover its oil content.

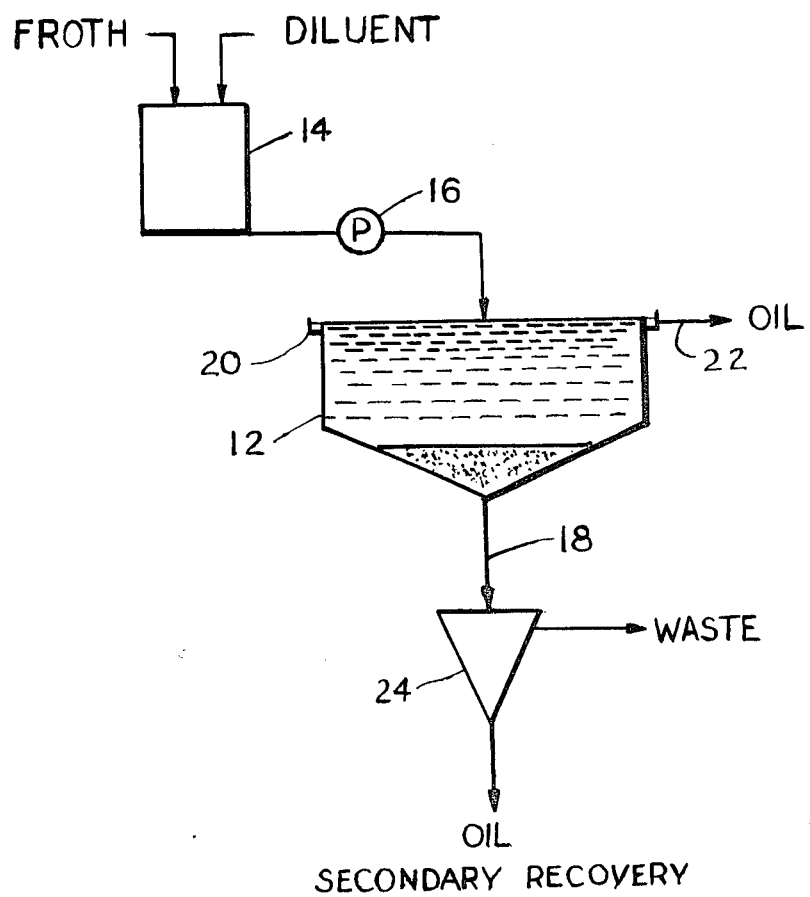

PROCESS FOR TREATING A BITUMINOUS FROTH

This invention relates to a process for the effective removal of entrained solids, water and foreign matter from an aqueous hydrocarbon emulsion. More particularly, this invention relates to a process for the effective separation of solids and emulsified water from a bituminous froth or oil.

At present, crude oil constitutes a principal source of raw material for the production of various hydrocarbon fuels such as gasoline, kerosene, diesel fuel, fuel oil, residual oil, naphtha, and a host of hydrocarbon byproducts. However, it is likely that such crude oil sources will become less available and yield a smaller portion of the necessary raw material for production of the above products. Besides coal, an abundance of petroleumlike material is available in the form of extremely high viscosity petroleumlike compositions trapped and mixed together with various mineral solids such as sand and shale. These materials are principally in the form of shale oils and tar sands and are respectively located in abundance in the United States and Canada. These sources are immediately available reservoirs of petroleum-type raw materials for supplementing the supply of crude oil, and in the case of the Canadian tar sands are being presently exploited by at least one commercial operation.

In the treatment of tar sands to separate the hydrocarbon portion, commonly called bitumen, the tar sands are initially mined, preferably by strip mining, subjected to various ore processing steps such as crushing, sizing, screening, washing and then slurried with hot water. The slurry is then subjected to a preliminary gravity separation in which the bitumen separates from the aqueous slurry as a bituminous forth. The major portion of the solids settle during the separation and are removed along with a major portion of the water. The resulting product from the separation step is a bituminous froth typically containing about 70% bitumen, 20% water, and about 10% various clay solids and sand particles, principally fines. Subsequent treatment before the bitumen is suitable as a raw material for conventional or modified petroleum refinery processes requires removal of almost all of the water, and substantially all of the entrapped solids, principally sand particles in the 0 to 44 micron range.

The process must of course be feasible in terms of capital equipment and operating cost in order to yield a final product which is economically equivalent to the cost of crude oil. Thus, an advantageous treatment of the bituminous froth would be to feed the froth into a settling tank and allow the various inclusions to separate by gravity into their various phases. Water, being heavier than the bitumen or oil phase, would in sufficient time tend to settle out and separate from the oil phase. Similarly, the solids, particularly the sand fines, tend to sink to the bottom of the settling tank and form a sludge. However, various difficulties are encountered while practicing such a procedure. A tough membrane is formed in the area of the oil-water phase separation, and prevents the transfer of impurities into the water phase. A thick sludge then builds up at the oil-water interface which results in oil recoveries of as low as 60% and in handling problems.

I have therefore invented a process for the effective removal of solids and foreign matter. The process comprises feeding the bituminous froth preferably diluted with a light hydrocarbon diluent into a settling vessel, and maintaining the diluted froth in the settling vessel for a time to allow the solids and emulsified water to settle to the bottom of the vessel as a tightly concentrated emulsion, that is a sludge. Simultaneously the diluted bitumen froth now having a substantially reduced amount of impurities is removed as overflow from the top of the vessel while the sludge is withdrawn from the bottom of the vessel. The sludge is subsequently centrifuged to separate and secondarily recover bitumen and diluent therefrom.

It is therefore an object of this invention to provide a novel and effective process for the efficient separation of entrapped solids, water and other foreign matter from a bituminous froth.

Another object of this invention is to provide a process for the efficient treatment of a bituminous froth stream to eliminate the need for interfacial control in a separation of solids and water from the froth.

Other objects and advantages of the process of this invention will become apparent from the description of the drawings and preferred embodiments of the invention which follow.

The drawing shows in schematic form the process of this invention.

The bituminous froth is a hydrocarbon oil and water emulsion, the water being the dispersed phase in the system. Bitumen is the tarlike heavy hydrocarbon material found in the Athabasca tar sands of Alberta, Canada. It is recovered from the tar sands by slurrying the sands in hot water, and subjecting the slurry to primary separation to recover sand, water, and bitumen as a bituminous froth. Typically the bituminous froth contains from about 10% to about 60% water, from 5% to 20% mineral solids, and from about 30% to about 85% bitumen.

The froth is diluted with a liquid hydrocarbon solvent as a diluent, preferably a hydrocarbon liquid boiling in the range of 200° to 500° F., a suitable example of which is coker naphtha. Examples of the other diluents which may be used are various types of naphthas, light cycle oils, light distillates, kerosene, and other refinery streams boiling in the 200° to 500° F. range.

The bituminous emulsion and diluent are mixed prior to being passed to a settling vessel 12 in a mixing tank 14 or any other suitable mixing means such as by feeding desired amounts of each into a single conduit. The bituminous froth is diluted with a liquid hydrocarbon solvent such as coker naphtha at naphtha to bitumen ratios of from 0.8 to 1.2. Typically the diluted froth contains from about 10 % to about 30% water, from 5% to 10% mineral solids, the remainder being bitumen and diluent.

The diluted froth is pumped by a suitable pumping means 16 to the settling vessel 12, where the heavier impurities, that is solids and water droplets settle to the bottom of the vessel to form a sludge. A minimum residence time of of 1 hour is preferred to allow the impurities to settle to the bottom of the settling vessel. As a consequence a conventional settler is selected based upon manufacturer's specifications which will accommodate the desired feed rate at a minimum residence time of 1 hour. The resulting sludge is a concentrated stable emulsion which contains most of the impurities originally in the diluted bituminous froth. Very little free water is present so that there is no water phase in the vessel 12, thereby also precluding the establishment of an oil-water interface with its attendant problems. The sludge is continuously removed from the bottom of the settling vessel at a rate of between about 4% and 5% by volume of the diluted bituminous froth feed rate.

The settling vessel 12 is any suitable type of conventional settling vessel and as depicted herein is a generally cylindrical vessel having a conically shaped bottom with a sludge discharge port in the apex of the cone and a discharge conduit 18 attached to the port. An overflow removal means is mounted in the upper portion of the vessel and may be of any suitable design such as an annular trough 20 surrounding the upper rim of the vessel with a product removal conduit 22 connected to the trough.

Sludge is continually removed at the rate of between 4 and 5 vol. % of the diluted froth feed rate from the vessel 12 and fed via conduit 18 to a centrifuge 24 also of conventional design. Subjecting of the sludge to the action of the centrifuge results in significant secondary recovery of oil (bitumen and diluent) and limits loss in treating the original froth to about 1% of the total oil. The secondary recovery product is combined with the main product from the settling vessel for further processing.

With a view to more fully describing the method of this invention the following examples are given by way of illustration and not limitation.

EXAMPLE I

Bituminous froth was mixed with coker naphtha in the ratio of one part froth to 0.807 parts naphtha (by wt,) and fed into the settling vessel which was maintained at room temperature (about 75° F.) where it was retained for about 1 hour residence time. The diluted feed to the settling vessel comprised 77.46% wt. oil, (bitumen and naphtha), 18.31% wt. water, and 4.23% solids. Product withdrawn as overflow from the settling vessel comprised 91.02% wt. oil (bitumen and naphtha), 7.49% wt. water, and 1.49% wt. solids. This represents a recovery efficiency of 95.57% of the oil. Sludge comprised 12.24% wt. oil, 78.62% wt. water, and 9.14% wt. solids.

EXAMPLE II

Bituminous froth was mixed with coker naphtha to obtain a diluted froth having a naphtha to bitumen ratio of 1.078, and fed to the settling vessel. The froth feed comprised 73.87% wt. oil (naphtha and bitumen), 22.12% water and 4.01% wt. solids. After similar treatment to that described above in example I, the product withdrawn as overflow comprised 92.68% wt. oil, 5.77% wt. water, and 1.55% wt. solids. This represented a 96.13% recovery of available oil (naphtha and bitumen) in the feed. Sludge comprised 12.07% wt. oil, 75.96% wt. water and 11.97% wt. solids.

EXAMPLE III

A sample of sludge processed according to examples I and II was subjected to centrifuging at 1,000 r.p.m. for 10 minutes. The resulting liquid product comprised about 98.7% wt. oil, 0.7% wt. water and 0.5% solids. The effective secondary recovery was about 67% wt. of the oil in the sludge and results in an overall combined effective recovery of at least 98%.

EXAMPLE IV

A sludge sample similar to that of example III was subjected to centrifuging at 2,000 r.p.m. for 10 minutes. Effective secondary recovery of oil was on the order of about 91%. This represents a combined effective overall recovery of at least 99%.

EXAMPLE V

A sample similar to that of example III was subjected to centrifuging at 1,500 r.p.m. for 10 minutes. The resulting effective secondary recovery of oil was about 78%. Overall oil recovery is therefore at least 99%, when combined with the process of example I and of about 99.5% when combined with the process of example II.

It can therefore be seen that processing bituminous froth according to the present invention results in a significant reduction in water and solids content while still limiting process loss of oil (naphtha and bitumen) to less than 1% Having thus fully described the invention and wishing to cover those modifications and variations which would be apparent to those skilled in the art without departing from the spirit and scope of the invention,

What I claim is:

1. A process for the removal of solids and emulsified water from a bituminous froth, said froth being the overflow stream from the hot water separation of bituminous tar sands and comprising from about 10% to about 60% vol. water, from 5% to 20% solids and from about 30% to about 85% bitumen, said process comprising diluting the bituminous froth with a hydrocarbon diluent in the ratio of between about 0.8 and 1.2 diluent to bituminous froth by volume, feeding said diluted bituminous froth to a settling zone, maintaining said diluted bituminous froth in the settling zone for a sufficient residence time to allow the solids and emulsified water to settle to the bottom of the settling zone as a unitary sludge without a water bitumen interface, removing the diluted bituminous froth substantially free of solids and emulsified water as overflow from the top of said settling zone, simultaneously and continuously withdrawing the settled sludge from the bottom of said settling zone at a rate sufficient to preclude establishment of an oil-water interface in said settling zone, and centrifuging said withdrawn sludge to separate bitumen and diluent from the settled solids and emulsified water.

2. The method of claim 1 wherein said sludge is withdrawn from the settling zone at a rate of between 4% and 5% by volume of said diluted bituminous froth feed.

3. The method of claim 1 wherein said step of maintaining said diluted bituminous froth in the settling zone for a sufficient residence time comprises maintaining said diluted froth in the settling zone for a minimum of 1 hour.

4. The method of claim 3 wherein said sludge is withdrawn from the settling zone at a rate of between 4% and 5% by volume of said diluted bituminous froth feed.

5. The method of claim 1 wherein said diluent is coker distillate.